United States Patent
Hsu et al.

[11] Patent Number: 6,094,367
[45] Date of Patent: Jul. 25, 2000

[54] VOLTAGE REGULATING DEVICE FOR DYNAMICALLY REGULATING VOLTAGE IN A COMPUTER SYSTEM

[75] Inventors: Hsien-Yueh Hsu, Taipei; Long-Loon Shiu, Chang-Hua Hsien, both of Taiwan

[73] Assignee: ASUSTeK Computer Inc., Taipei, Taiwan

[21] Appl. No.: 09/343,042

[22] Filed: Jun. 29, 1999

[30] Foreign Application Priority Data

Nov. 18, 1998 [TW] Taiwan ................................. 87119083

[51] Int. Cl.[7] ........................... H02M 3/24; H02M 5/42
[52] U.S. Cl. ........................ 363/78; 363/74; 327/538; 327/73; 327/77
[58] Field of Search ................................ 327/73, 77, 87, 327/538, 540; 363/78, 74

[56] References Cited

U.S. PATENT DOCUMENTS

| | | | |
|---|---|---|---|
| 5,774,734 | 6/1998 | Kikinis et al. | 713/300 |
| 5,874,830 | 2/1999 | Baker | 323/316 |
| 5,903,182 | 5/1999 | Jordan | 327/540 |
| 5,919,262 | 7/1999 | Kikinis et al. | 713/300 |
| 5,927,050 | 7/1999 | Houck et al. | 53/428 |
| 5,996,074 | 11/1999 | Houck et al. | 713/2 |

*Primary Examiner*—Edward H. Tso
*Assistant Examiner*—Bao Q. Vu
*Attorney, Agent, or Firm*—J.C. Patents; Jiawei Huang

[57] ABSTRACT

The invention provides a voltage regulating device for regulating the operating voltage of a CPU in a computer system. The voltage regulating device includes a voltage identification signal regulator and a voltage identification signal bridge. The voltage identification signal regulator is controlled by a controlling signal to output a voltage identification regulating signal to the voltage converter. In this case, the voltage converter outputs the operating voltage of the CPU according to the voltage identification regulating signal. Meanwhile, a voltage monitor is used to monitor the operating voltage. When the voltage identification signal regulator outputs the voltage identification regulating signal, a voltage identification signal bridge blocks a default voltage identification signal output from the voltage identification signal setting device.

20 Claims, 5 Drawing Sheets

કેટ 7 series CPUs. That is, the operating voltage of a CPU is set
VOLTAGE REGULATING DEVICE FOR DYNAMICALLY REGULATING VOLTAGE IN A COMPUTER SYSTEM

CROSS-REFERENCE TO RELATED APPLICATION

This application claims the priority benefit of Taiwan application serial no. 87119083, filed Nov. 18, 1998, the full disclosure of which is incorporated herein by reference.

BACKGROUND OF THE INVENTION

1. Field of the Invention

The invention relates to a device for supplying voltage in a computer system, and more particularly to a voltage regulating device for dynamically regulating voltage in a computer system.

2. Description of the Related Art

Figure 1:
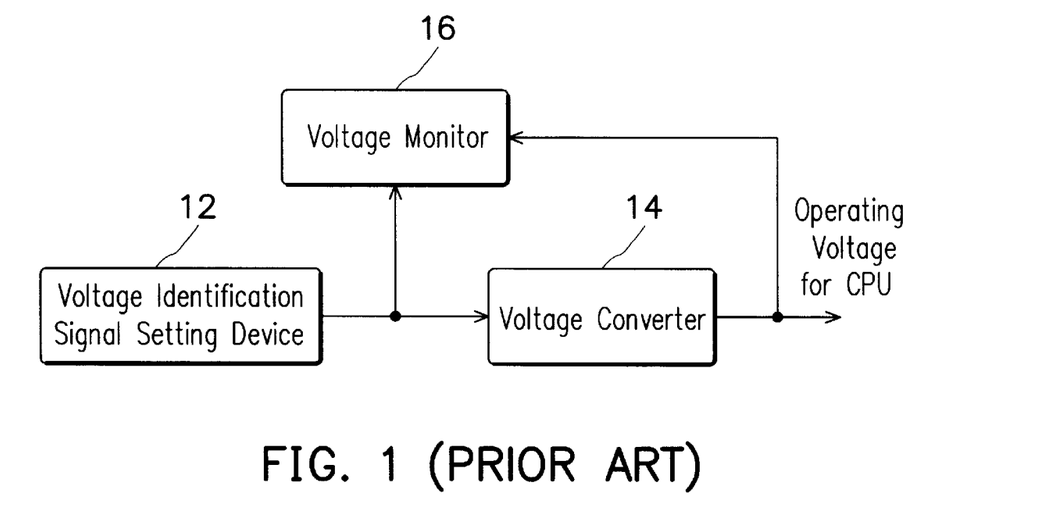
FIG. 1 is a block circuit diagram showing a device for controlling the operating voltage of a CPU according to the prior art.

FIG. 1 is a block circuit diagram showing a device for controlling the operating voltage of a CPU according to the prior art. The operating voltage of the CPU is determined according to the type thereof. Basically, all CPUs can be classified into:

1. Socket 7 series—A socket 7 series CPU itself does not include a device for generating a voltage identification signal. Referring to FIG. 1, an external voltage identification signal setting device 12, such as a jumper switch, is needed to output a voltage identification signal to a voltage converter 14. The voltage converter 14 outputs the operating voltage of the CPU according to the received voltage identification signal. At the same time, a voltage monitor 16 estimates a correct voltage according to the voltage identification signal, and then compares it with the output operating voltage. If the output operating voltage is outside a voltage range located around the correct voltage, a warning signal is emitted for users, so that a computer system can be prevented from damages. Furthermore, the voltage monitor 16 is a hardware monitor. Therefore, users can adjust the jumper switch to determine the operating voltage of the CPU.

2. Slot 1, Slot 2 and Socket 370 series—each type of CPU includes the voltage identification signal setting device 12 having a number of pins for providing a voltage identification signal. Moreover, floating/grounding the pins is determined before completely manufacturing the CPU by providing each pin with a pull-down circuit. Referring to FIG. 1, a voltage identification signal is directly transmitted to the voltage converter 14. The voltage converter 14 outputs the operating voltage of the CPU according to the voltage identification signal. Similarly, the voltage monitor has the same function as described above. As an example, an Intel Klamath CPU has 5 pins VID0–VID4 with logic levels 1, 1, 1, 0, 1, respectively, serving as a voltage identification signal. The voltage converter 14 receives the voltage identification signal, and transmits a voltage of 2.8V to the CPU according to a built-in checklist. Moreover, if the pins VID0–VID4 are set at logic levels 1,0,0,0,0, serving a voltage identification signal, the voltage converter 14 receives the voltage identification signal, and transmits a voltage of 2.0V to the CPU. It is obvious from the above that the operating voltage of the CPU depends on its type.

Accordingly, the operating voltages of Slot 1, Slot 2 and Socket 370 series CPUs cannot be set by users. Under some circumstances, the users, however, would like to change the operating voltages thereof. For example, when users require a CPU to operate at an over-clock, it is desirable to increase the operating voltage of the CPU to enhance the stability of the computer system. Inversely, when users require the CPU to operate at a lower frequency, properly lowering the operating voltage of the CPU not only cannot affect the stability of the computer system, but also reduces power consumption and heat created.

As with all similar computer systems, the way to regulate the operating voltages of CPUs is the same as that for Socket 7 series CPUs. That is, the operating voltage of a CPU is set directly by a jumper switch regardless of a voltage identification signal of the CPU. However, it is inconvenient for users because a computer cover must be removed every time the setting is to be changed. Furthermore, if the operating voltage is erroneously set, for example, the operating voltage should be a suggested voltage value of 2.5, and is unintentionally set to a voltage value of 3.5, the CPU may be damaged permanently.

SUMMARY OF THE INVENTION

In view of the above, a first object of the invention is to provide a voltage regulating device for automatic or software-setting voltage control. It is convenient for users because it does not require removing a computer cover.

A second object of the invention is to provide a voltage regulating device for properly increasing the operating voltage of a central processing unit (CPU), thereby enhancing the stability of the CPU during over-clock operating.

A third object of the invention is to provide a voltage regulating device for properly lowering the operating voltage of a CPU, thereby reducing power consumption and heat created when the CPU is operating at a lower frequency.

A fourth object of the invention is to provide a voltage regulating device for incrementally changing voltage, thereby avoiding a voltage glitch generated by drastic changing which results in an unstable computer system.

A fifth object of the invention is to provide a voltage regulating device for limiting the adjustable range of voltage, thereby protecting CPUs from damage caused by an erroneous setting.

To achieve the above-stated objects, a first voltage regulating device in accordance with the invention includes a voltage identification signal setting device for outputting a default voltage identification signal from the output terminal thereof; a voltage identification signal regulator of which the input terminal receives a controlling signal, and the output terminal transmits a voltage identification regulating signal; a voltage identification signal bridge of which the input terminal is electrically connected to the output terminal of the voltage identification signal setting device to receive the default voltage identification signal, and the output terminal is electrically connected to the output terminal of the voltage identification signal regulator, wherein the voltage identification signal bridge outputs the default voltage identification signal if the voltage identification signal regulator does not output the voltage identification regulating signal; a voltage converter of which the input terminal is electrically connected to the output terminals of the voltage identification signal regulator and the voltage identification signal bridge for outputting a controlled voltage from the output terminal thereof according to the voltage identification regulating signal coming from the voltage identification signal regulator or the default voltage identification signal coming from the voltage identification signal bridge; and a voltage monitor of which a first input terminal is electrically connected to the output terminals of the voltage identification signal regulator and the voltage identification signal bridge, and a second input terminal is electrically connected to the output terminal of the voltage converter for monitoring whether the controlled voltage is within a tolerable range according to the voltage identification regulating signal or the default voltage identification signal.

A second voltage regulating device according to the invention for regulating the operating voltage of a CPU in a computer system which has a voltage identification signal setting device and a voltage converter, comprises a voltage identification signal regulator of which the output terminal is electrically coupled to the input terminal of the voltage converter for receiving a controlling signal and transmitting a voltage identification regulating signal from the output terminal thereof so as to control the voltage converter to output the operating voltage of the CPU having a destination voltage value; and a voltage identification signal bridge of which the input terminal is electrically coupled to the output terminal of the voltage identification signal setting device, and the output terminal is electrically coupled to the input terminal of the voltage converter for blocking a default voltage identification signal output from the voltage identification signal setting device when the voltage identification signal regulator outputs the voltage identification regulating signal.

In the two voltage regulating devices mentioned above, the default voltage identification signal is output from the voltage identification signal setting device via the voltage identification signal bridge to control the voltage converter to output the operating voltage of the CPU having a default voltage value when the voltage identification signal regulator does not output the voltage identification regulating signal. Additionally, the operating voltage of the CPU is incrementally changed from the default voltage value to the destination voltage value.

A third voltage regulating device according to the invention comprises a voltage identification signal setting device for outputting a default voltage identification signal;

a voltage converter for receiving either the default voltage identification signal or a voltage identification regulating signal through a voltage identification signal bus and transmitting a controlled voltage; a voltage monitoring and identification signal regulating device for receiving a controlling signal and transmitting the voltage identification regulating signal to the voltage converter through a voltage identification signal bus, and monitoring the controlled voltage; and a voltage identification signal bridge for passing the default voltage identification signal from the voltage identification signal setting device to the voltage converter through the voltage identification signal bus when the voltage monitoring and identification signal regulating device does not output the voltage identification regulating signal to the voltage converter through the voltage identification signal bus.

A fourth voltage regulating device according to the invention comprises a voltage identification signal setting device for outputting a default voltage identification signal; a voltage converter electrically coupled to the voltage identification signal setting device for receiving a controlling signal and then transmitting a controlled voltage by selecting either the default voltage identification signal or a voltage identification regulating signal which is contained in the control signal; and a voltage monitor electrically coupled to the voltage identification signal setting device and the voltage converter for receiving the controlling signal and monitoring the controlled voltage.

A method for regulating voltage by the fourth voltage regulating device comprises the following steps. First, the default voltage identification signal is provided by the voltage identification signal setting device. The controlled voltage having a default voltage value is outputted from the voltage converter according to the default voltage identification signal. Monitoring the controlled voltage is stopped by the voltage monitor. The controlling signal is provided to the voltage converter, and the controlled voltage having a destination voltage value is provided according to the voltage identification regulating signal by the voltage converter. Also, the controlled voltage is monitored according to the voltage identification regulating signal by the voltage monitor with a control of the controlling signal.

Furthermore, a method for regulating voltage, suitable to regulate the operating voltage of a CPU in a computer system, comprises the following steps. First, a default voltage identification signal is provided. The operating voltage of the CPU having a default voltage value is outputted according to the default voltage identification signal. A controlling signal is provided to output a voltage identification regulating signal and to block the default voltage identification signal. The operating voltage of the CPU having a destination voltage value is outputted according to the voltage identification regulating signal. The operating voltage of the CPU is monitored according to the voltage identification regulating signal.

BRIEF DESCRIPTION OF THE DRAWINGS

The invention will become more fully understood from the detailed description given hereinbelow and the accompanying drawings which are given by way of illustration only, and thus do not limit the present invention, and wherein.

DETAILED DESCRIPTION OF THE PREFERRED EMBODIMENTS

Figure 2:
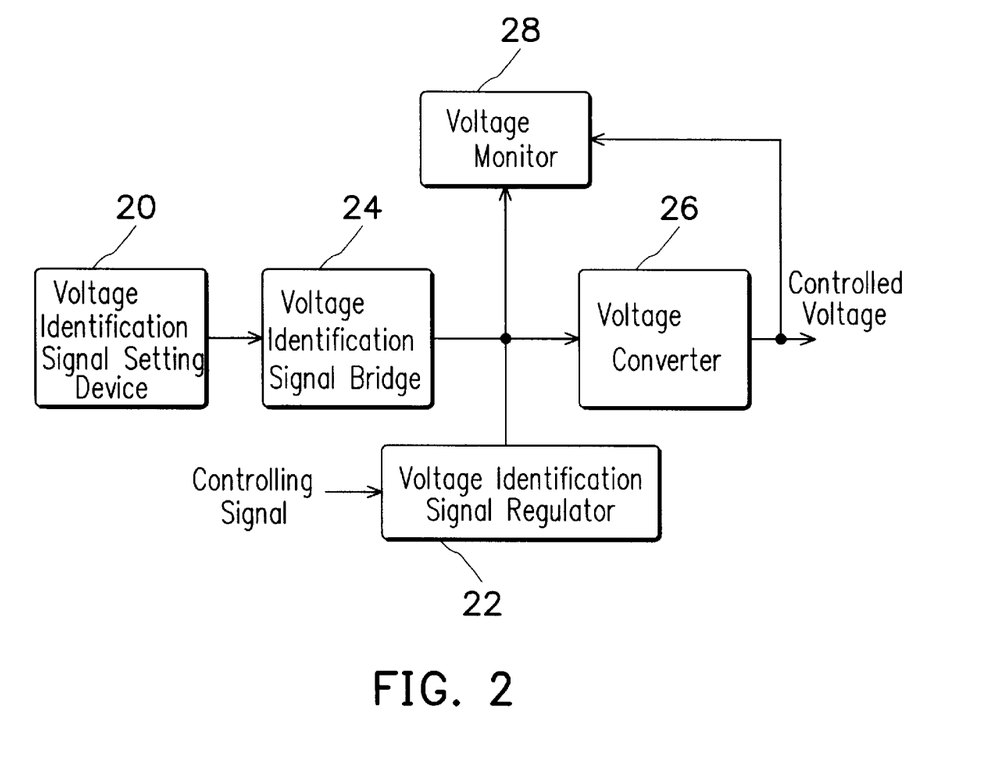
FIG. 2 is a block circuit diagram showing a voltage regulating device according to a first embodiment of the invention.

FIG. 2 is a block circuit diagram showing a voltage regulating device according to a first embodiment of the invention. Referring to FIG. 2, the voltage regulating device includes a voltage identification signal setting device 20, a voltage identification signal regulator 22, a voltage identification signal bridge 24, a voltage converter 26 and a voltage monitor 28. The voltage identification signal setting device 20 can be formed in a central processing unit (CPU) by a manufacturer or can be a jumper switch for allowing users to set a default voltage identification signal. The voltage monitor 28 is generally a hardware monitor IC.

The voltage identification signal setting device 20 outputs a default voltage identification signal to the input terminal of the voltage identification signal bridge 24. Since the voltage identification signal regulator 22 is defaulted not to transmit any voltage identification regulating signal, the voltage identification signal bridge 24 passes the default voltage identification signal from the output terminal thereof to the voltage converter 26 and the voltage monitor 28. Then, the voltage converter 26 transmits a controlled voltage having a default voltage value according to the default voltage identification signal. The voltage monitor 28 monitors whether the controlled voltage is within a tolerable range located around the default voltage value according to the default voltage identification signal.

However, when the voltage identification signal regulator 22 is controlled by a controlling signal to output a voltage identification regulating signal to the voltage converter 26 and the voltage monitor 28 according to a basic BIOS or a software, or a hardware, such as a built-in checklist table (not shown) in the voltage identification signal regulator 22, the voltage identification signal bridge 24 blocks the default voltage identification signal from outputting. In this case, the voltage converter 26 outputs a controlled voltage having a destination voltage value according to the voltage identification regulating signal. At the same time, the voltage monitor 28 monitors whether the controlled voltage is within a tolerable range located around the destination voltage value according to the voltage identification regulating signal.

For users, a desired voltage value of the controlled voltage can be selected according to a setting selective sheet of the BIOS or a specific application program, or a hardware. In other words, the voltage identification signal output from the voltage identification signal setting device 20 can be automatically given adjustable upper and lower limits in voltage according to the BIOS, a software or a hardware, such as a built-in checklist table (not shown) in the voltage identification signal regulator 22, thereby protecting the CPU or related elements from damage due to an overly high or low regulated voltage or preventing an unstable computer system from occurring. As an example, the controlled voltage can be incrementally changed from 2.0V to 2.1V, then to 2.2V during regulating process, such that it can prevent an unstable computer system resulting from a drastic change of voltage.

Figure 3:
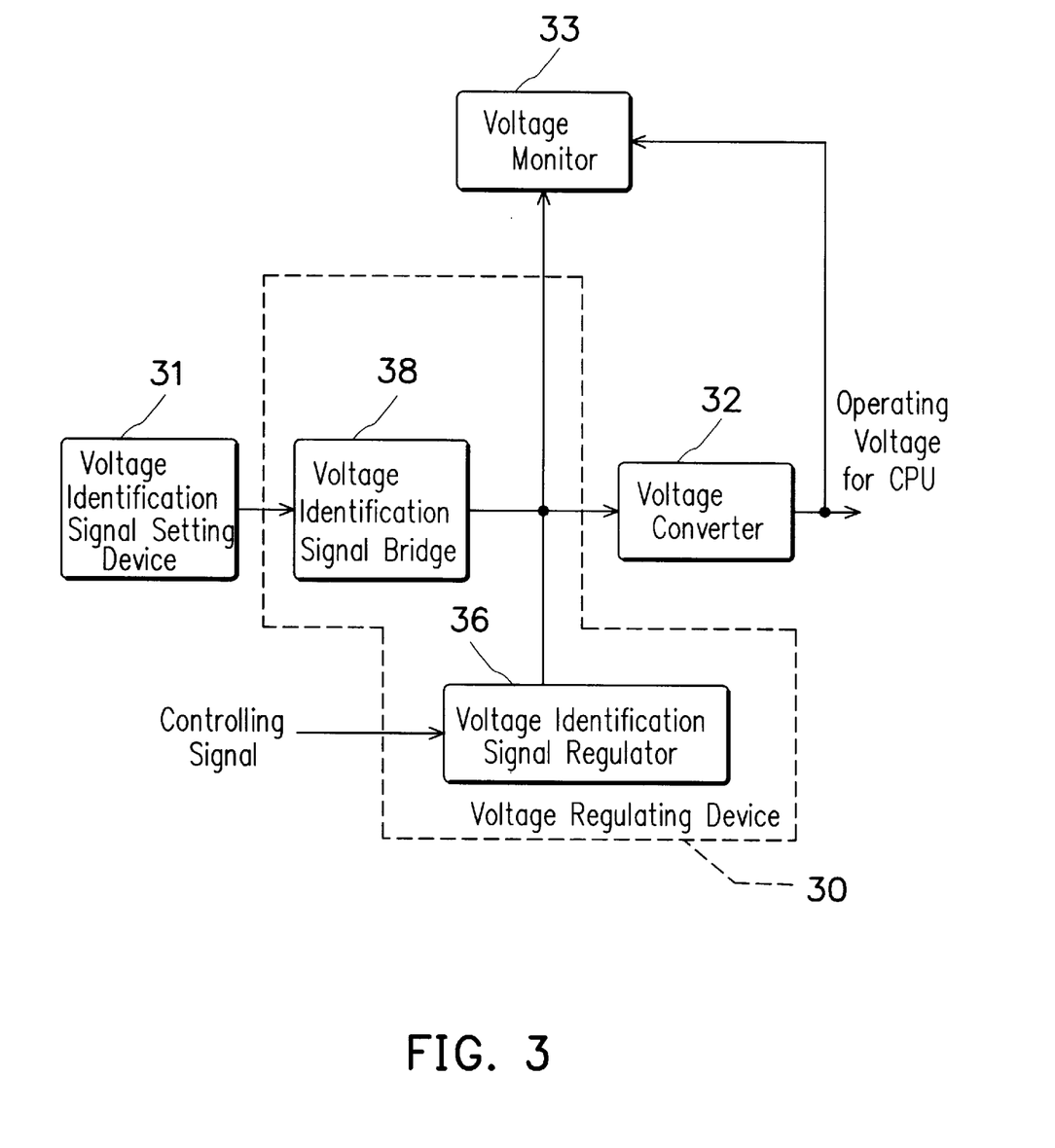
FIG. 3 is a circuit block diagram showing a voltage regulating device according to a second embodiment of the invention.

FIG. 3 is a circuit block diagram showing a voltage regulating device 30 according to a second embodiment of the invention. Referring to FIG. 3, the voltage regulating device 30 is mainly used to regulate the operating voltage of a CPU in a personal computer system. The personal computer system not only includes a voltage identification signal setting device 31 and a voltage converter 32, but also further includes a voltage monitor 33. The voltage regulating device 30 includes a voltage identification signal regulator 36 and a voltage identification signal bridge 38. Similarly, the voltage identification signal setting device 31 can be formed in the CPU and set by manufacturers, or can be a jumper switch to be previously set for its own voltage identification signal by users.

In the second embodiment, the voltage identification signal regulator 36 is controlled by a controlling signal to transmit a voltage identification regulating signal to the voltage converter 32 and the voltage monitor 33. In this case, the voltage converter 32 outputs the operating voltage of a CPU having a destination voltage value according to the voltage identification regulating signal. At the same time, the voltage monitor 33 monitors the operating voltage of the CPU according to the voltage identification regulating signal. Moreover, the input of the voltage identification signal bridge 38 is connected to the output of the voltage identification signal setting device 31 while the output of the voltage identification signal bridge 38 is connected to the output to the voltage identification signal regulator 36. When the voltage identification signal regulator 36 outputs the voltage identification regulating signal, the voltage identification signal bridge 38 blocks a default voltage identification signal generated by the voltage identification signal setting device 31 from outputting to the inputs of the voltage converter 32 and the voltage monitor 33. Inversely, when the voltage identification signal regulator 36 does not output the voltage identification regulating signal, the voltage identification signal bridge 38 passes the default voltage identification signal to the inputs of the voltage converter 32 and the voltage monitor 33. Since the voltage identification signal regulator 36 is defaulted not to transmit the voltage identification regulating signal, the voltage converter 32 outputs the operating voltage of the CPU having a default voltage value according to the default voltage identification signal. Like the first embodiment, the operating voltage of the CPU can be incrementally changed.

As known by those skilled in the art, it is unnecessary to have the voltage monitors 28, 33 function in the first and second embodiments. The operating voltage of a CPU may not be monitored by a closed loop for the consideration of costs or the like. Therefore, the voltage monitor can be omitted.

Figure 4:
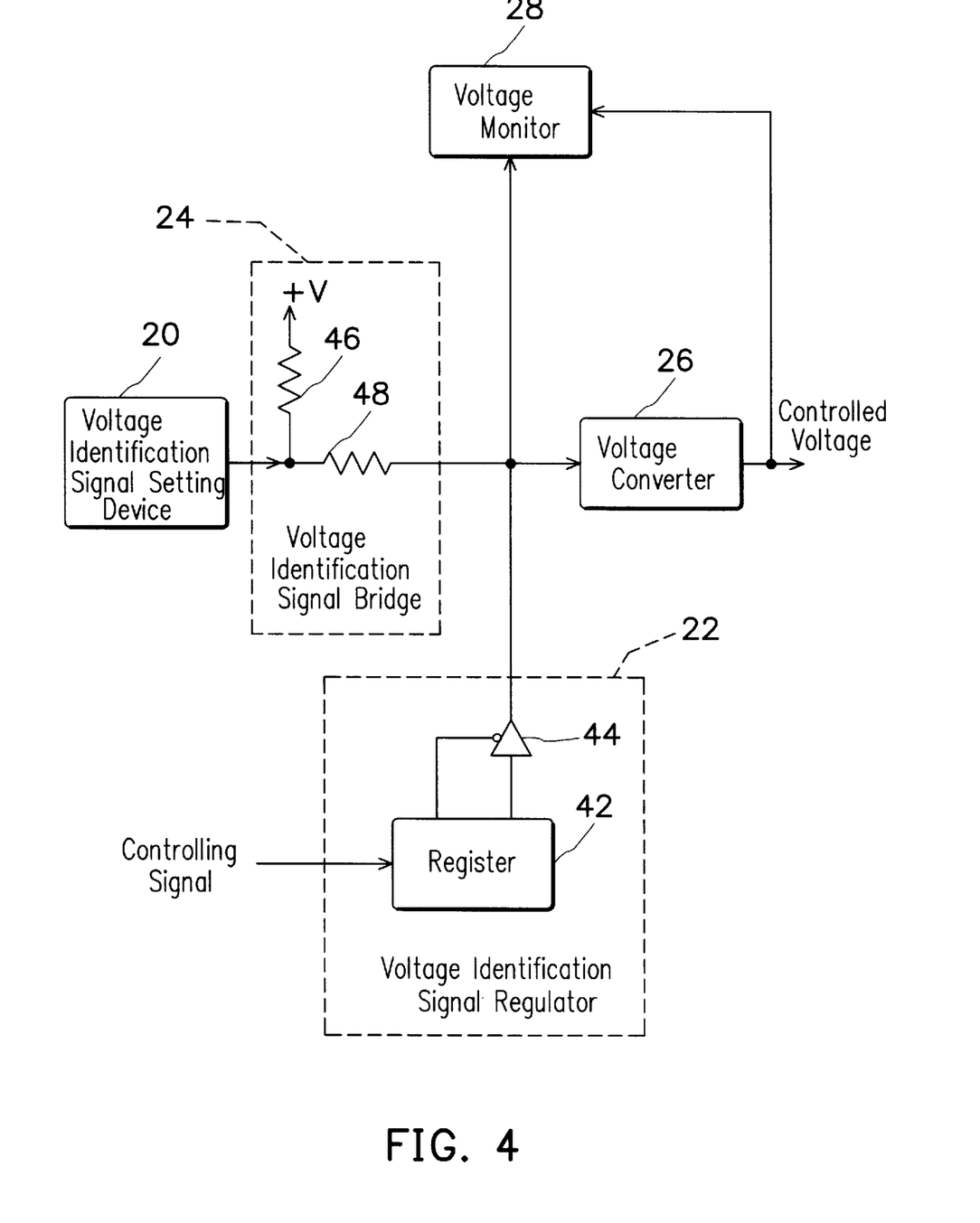
FIG. 4 is a detailed circuit block diagram of the voltage regulating device of FIG. 2.

FIG. 4 is a detailed circuit block diagram of the detailed voltage regulating device of FIG. 2. Referring to FIG. 4, the voltage identification signal regulator 22 includes a programmable controlled register 42 and a 3-state buffer 44. The programmable controlled register 42 is controlled by a controlling signal for a desired output value. The 3-state buffer 44 is also controlled by the controlling signal, and selects part of the controlling signal to be a voltage identification regulating signal or turn the output of the 3-state buffer 44 into a high-impedance state, i.e., it can be used to enable or disable the output of the register 42. Additionally, the voltage identification signal bridge 24 includes a pull-up resistor 46, such as of 10KΩ, and a buffer resistor 48, such as of 1KΩ. One terminal of the pull-up resistor 46 is electrically connected to the output terminal of the voltage identification signal setting device 20 while the other terminal of which is electrically coupled to a high potential. One terminal of the buffer resistor 48 is electrically coupled to the output terminal of the voltage identification signal setting device 20 while the other terminal of which is electrically connected to the output terminal of the voltage identification signal regulator 22.

When starting a computer system, the output of the voltage identification signal regulator 22 is disabled (i.e., the output of the 3-state buffer 44 is at a high-impedance state). At this point, a voltage identification signal input to the voltage converter 26 is determined by the voltage identification signal setting device 20 which can be a jumper switch or can be set by CPU manufactures. After that, a desired voltage value can be selected just from a BIOS selecting sheet or a specific application program, such that an appropriate voltage identification signal is stored in the register 42 of the voltage identification signal regulator 22 by a controlling signal based on the selected voltage value. Subsequently, the output of the voltage identification signal regulator 22 is enabled for outputting a voltage identification signal. Since the buffer resister 48 is activated, the output of the voltage converter 26 is completely determined by the voltage identification signal regulator 22. Thereafter, the register 42 is repeatedly filled with new values by means of a controlling signal, thereby regulating the controlled voltage, step by step, until a user-set voltage value is reached.

As known by those skilled in the art, a single signal line adopted for transmitting a voltage identification signal shown in a schematic view of FIG. 4 can be replaced with a signal bus. The voltage identification signal bridge 24 can be a logic device, such as a conventional 3-state buffer with a model number 74244, a 3-state bus transceiver with a model number of 74245 or the like.

Figure 5:
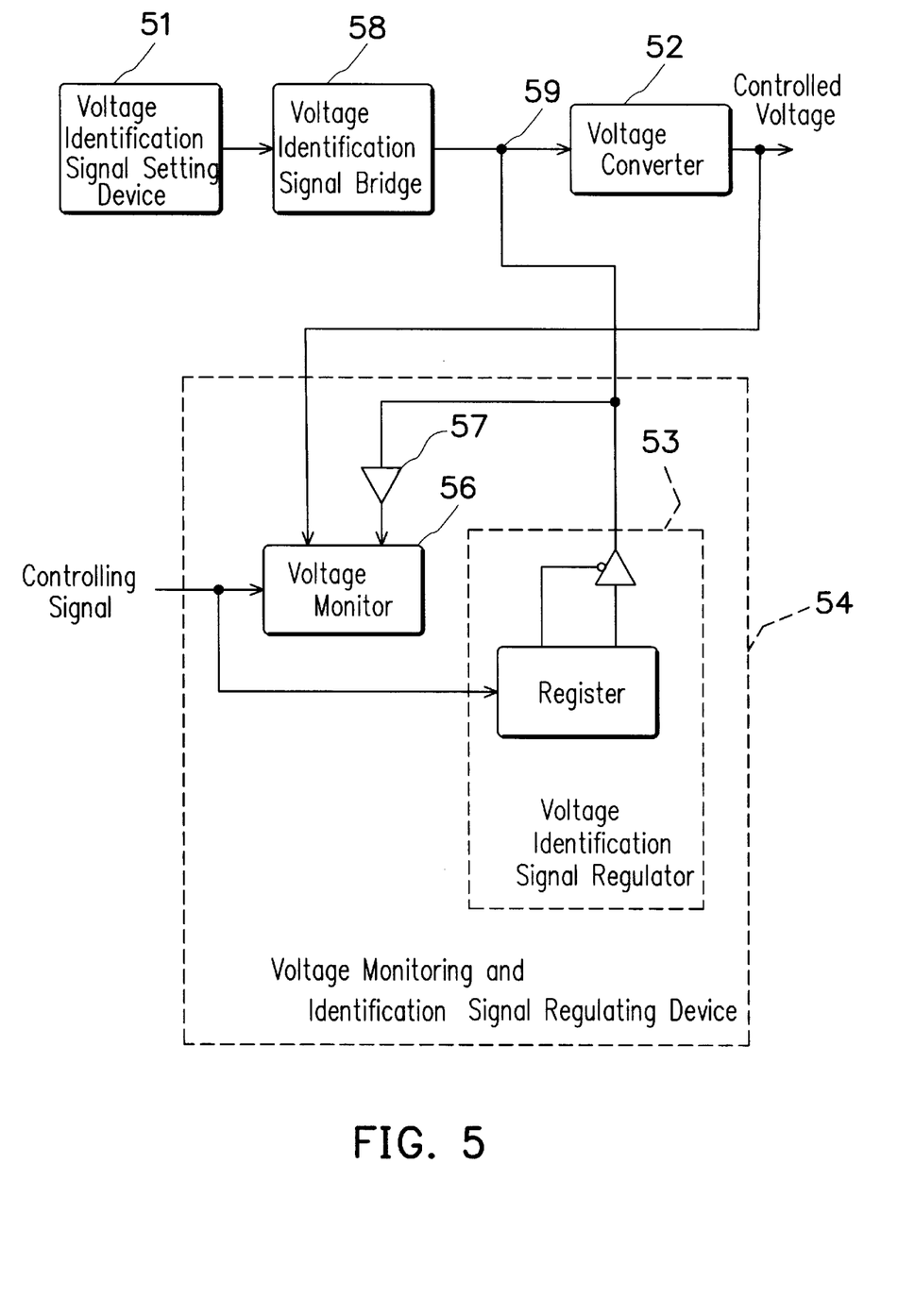
FIG. 5 is a circuit block diagram showing a voltage regulating device according to a third embodiment of the invention.

FIG. 5 is a circuit block diagram showing a voltage regulating device according to a third embodiment of the invention. Referring to FIG. 5, a main difference from the first embodiment of FIG. 4 is that the voltage identification signal regulator 53 is combined with the voltage monitor 56. In other words, the voltage monitor 56 and the voltage identification signal regulator 53 are integrated in the same IC to form a voltage monitoring and identification signal regulating device. Since a number of pins, such as a voltage identification signal pin and a controlling signal pin, are shared with each other, all functions that are the same as those of FIG. 4 can be achieved without further adding to the number of pins. Furthermore, a register required by the voltage monitor 56 for storing a voltage identification signal can be separated from that of the voltage identification signal regulator 53. However, for further reducing costs, the voltage monitor 56 can share a register together with the voltage identification signal regulator 53.

The voltage regulating device of the third embodiment of the invention includes a voltage identification signal setting device 51, a voltage converter 52, a voltage identification signal bridge 58 and a voltage monitoring and identification signal regulating device 54. The voltage identification signal setting device 51 outputs a default voltage identification signal to the input terminal of the voltage identification signal bridge 58. The input terminal of the voltage converter 52 is electrically connected to a voltage identification signal bus 59 for outputting a controlled voltage according to a voltage identification signal on the voltage identification signal bus 59. The voltage monitoring and identification signal regulating device 54 has its own output terminal electrically connect to the voltage identification signal bus 59 for outputting a voltage identification regulating signal to the voltage identification signal bus 59 and monitoring whether the controlled voltage is within a tolerable range. The input terminal of the voltage identification signal bridge 58 is electrically connected to the output terminal of the voltage identification signal setting device 51 while the output of which is electrically connected to the voltage identification signal bus 59. When the voltage monitoring and identification signal regulating device 54 does not transmit a voltage identification regulating signal to the voltage identification signal bus 59, the voltage identification signal bridge 58 passes the default voltage identification signal to the voltage identification signal bus 59 from the voltage identification signal setting device 51.

In addition, the voltage monitoring and identification signal regulating device 54 includes a voltage identification signal regulator device 53 and a voltage monitor 56. The voltage identification signal regulating device 53 can receive a controlling signal and has its own output terminal electrically connect to the voltage identification signal bus 59 and outputting the voltage identification regulating signal to the voltage identification signal bus 59. The voltage monitor 56 is electrically connected to the voltage identification signal bus 59 for monitoring the controlled voltage according to a voltage identification signal on the voltage identification signal bus 59. Furthermore, the voltage identification signal regulator 53 includes a register and a 3-state buffer with the same functions as those of the first embodiment which will not be further described hereinafter.

The voltage monitoring and identification signal regulating device 54 of FIG. 5 has an input/output pin for a voltage identification signal access. When starting the computer system, the input/output pin is defaulted as an input pin which allows the voltage monitor 56 to receive the default voltage identification signal coming from the voltage identification signal setting device 51 which can be a jumper switch or can be previously set by CPU manufacturers. Thereafter, a desired voltage value is supplied to the voltage identification signal regulating device 53 by changing voltage with a BIOS selecting sheet or a specific application program, and the input/output pin is transferred into an output pin to output an appropriate voltage identification regulating signal to the voltage converter 52. At the same time, the voltage identification regulating signal also is fed back to the voltage monitor 56, such that the voltage monitor 56 can monitor whether the voltage identification regulating signal is correct. Furthermore, the lower and upper limits of a monitored voltage are properly regulated to avoid an error warning message from being created after voltage regulating.

Figure 6:
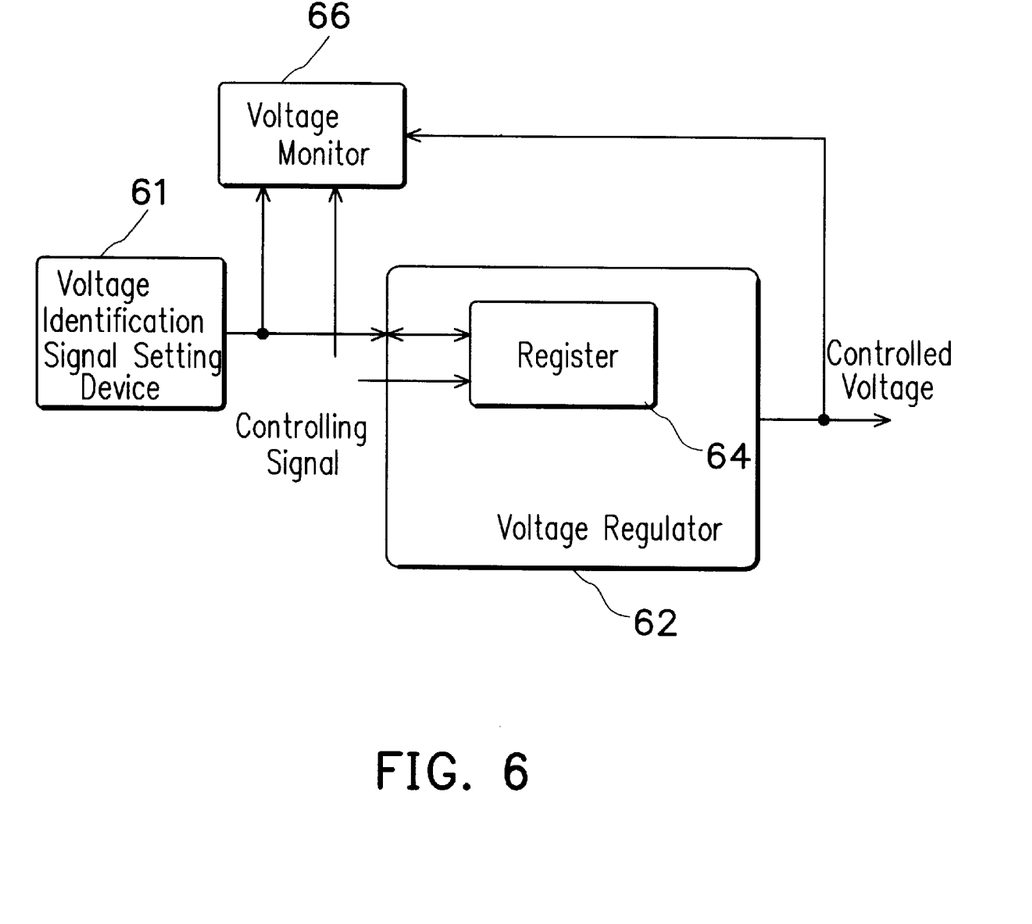
FIG. 6 is a circuit block diagram showing a voltage regulating device according to a fourth embodiment of the invention.

FIG. 6 is a circuit block diagram showing a voltage regulating device according to a fourth embodiment of the invention. Referring to FIG. 6, a register 64 originally included in a voltage identification signal regulator is integrated into a voltage converter 62 for storing a controlling signal. The voltage regulating device of the fourth embodiment includes a voltage identification signal setting device 61 for outputting a default voltage identification signal, a voltage converter 62 having its own input terminal connect to the output terminal of the voltage identification signal setting device 61 for receiving a controlling signal and transmitting a controlled voltage by selecting either the defaulting voltage identification signal or a voltage identification regulating signal contained in the controlling signal, and a voltage monitor 66 similarly for receiving the controlling signal and monitoring the controlled voltage.

A method for regulating voltage by the voltage regulating device includes the following steps. First, the voltage identification signal setting device 61 provides a default voltage identification signal. The voltage converter 62 outputs a controlled voltage having a default voltage value according to the default voltage identification signal. Next, the voltage monitor 66 temporarily stops monitoring the controlled voltage thereby to avoid an error warning message from occurring when changing voltage. The voltage converter 62 receives a controlling signal, and transmits a controlled voltage having a destination voltage value according to the voltage identification regulating signal. The voltage monitor 66 receives the controlling signal, and monitors the controlled voltage according to the voltage identification regulating signal.

In summary, a method for regulating voltage, and particularly for regulating the operating voltage of a CPU in a computer system, in accordance with the invention, includes the following steps. First, a default voltage identification signal is provided. The operating voltage of a CPU having a default voltage value is outputted according to the default voltage identification signal. Then, a voltage identification regulating signal is output by receiving a controlling signal, wherein the default voltage identification signal is blocked when the voltage identification regulating signal is output. The operating voltage of the CPU having a destination voltage value is output according to the voltage identification regulating signal. And, whether the operating voltage of the CPU is within a tolerable range is monitored according to the voltage identification regulating signal.

As known by those skilled in the art, the voltage identification signal regulator can use a currently existing SM Bus, 12C Bus, ISA Bus, PCI Bus, etc. As long as the output value of the voltage identification signal is programmable and attained, a future LPC Bus or any self-defined Bus can be used.

Furthermore, in addition to an application for regulating operating voltage of a CPU, the invention can be adapted to any application using a similar voltage identification signal for voltage determination.

While the invention has been described by way of example and in terms of the preferred embodiment, it is to be understood that the invention is not limited to the disclosed embodiment. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A voltage regulating device comprising:

a voltage identification signal setting device for outputting a default voltage identification signal from the output terminal thereof;

a voltage identification signal regulator of which the input terminal receives a controlling signal, and the output terminal transmits a voltage identification regulating signal;

a voltage identification signal bridge of which the input terminal is electrically connected to the output terminal of the voltage identification signal setting device to receive the default voltage identification signal, and the output terminal is electrically connected to the output terminal of the voltage identification signal regulator, wherein the voltage identification signal bridge passes the default voltage identification signal if the voltage identification signal regulator does not output the voltage identification regulating signal;

a voltage converter of which the input terminal is electrically connected to the output terminals of the voltage identification signal regulator and the voltage identification signal bridge for outputting a controlled voltage from the output terminal thereof according to the voltage identification regulating signal coming from the voltage identification signal regulator or the default voltage identification signal coming from the voltage identification signal bridge; and a voltage monitor of which a first input terminal is electrically connected to the output terminals of the voltage identification signal regulator and the voltage identification signal bridge, and a second input terminal is electrically connected to the output terminal of the voltage converter for monitoring the controlled voltage according to the voltage identification regulating signal or the default voltage identification signal.

2. The voltage regulating device as set forth in claim 1, wherein the default voltage identification signal can be automatically given adjustable upper and lower limits in voltage.

3. The voltage regulating device as set forth in claim 1, wherein the controlled voltage having a default voltage value is output from the voltage converter according to the default voltage identification signal if the voltage identification signal regulator does not output the voltage identification regulating signal, and the controlled voltage having a destination voltage value is output from the voltage converter according to the voltage identification regulating signal if the voltage identification signal regulator outputs the voltage identification regulating signal.

4. The voltage regulating device as set forth in claim 3, wherein the controlled voltage is incrementally changed from the default voltage value to the destination voltage value.

5. The voltage regulating device as set forth in claim 1, wherein the voltage identification signal regulator comprises:

a register for receiving and storing the controlling signal; and a 3-state buffer electrically coupled to the register and controlled by the controlling signal to either output the voltage identification regulating signal or turn the output of the 3-state buffer into a high impedance state.

6. The voltage regulating device as set forth in claim 1, wherein the voltage identification signal bridge comprises:

a pull-up resistor of which one terminal is electrically coupled to the output terminal of the voltage identification signal setting device, and the other terminal is electrically coupled to a high potential; and a buffer resistor of which one terminal is electrically coupled to the output terminal of the voltage identification signal setting device, and the other terminal is electrically coupled to the input terminal of the voltage converter.

7. The voltage regulating device as set forth in claim 1, wherein the voltage identification signal setting device is a jumper switch.

8. The voltage regulating device as set forth in claim 1, wherein the voltage identification signal setting device is formed in a CPU.

9. A voltage regulating device for regulating the operating voltage of a CPU in a computer system which has a voltage identification signal setting device and a voltage converter, the voltage regulating device comprising:

a voltage identification signal regulator of which the output terminal is electrically coupled to the input terminal of the voltage converter for receiving a controlling signal and transmitting a voltage identification regulating signal from the output terminal thereof so as to control the voltage converter to output the operating voltage of the CPU having a destination voltage value; and a voltage identification signal bridge of which the input terminal is electrically coupled to the output terminal of the voltage identification signal setting device, and the output terminal is electrically coupled to the input terminal of the voltage converter for blocking a default voltage identification signal output from the voltage identification signal setting device when the voltage identification signal regulator outputs the voltage identification regulating signal.

10. The voltage regulating device as set forth in claim 9, wherein the default voltage identification signal is output from the voltage identification signal setting device via the voltage identification signal bridge to control the voltage converter to output the operating voltage of the CPU having a default voltage value when the voltage identification signal regulator does not output the voltage identification regulating signal.

11. The voltage regulating device as set forth in claim 10, wherein the operating voltage of the CPU is incrementally changed from the default voltage value to the destination voltage value.

12. The voltage regulating device as set forth in claim 9, wherein the voltage identification signal setting device is a jumper switch.

13. The voltage regulating device as set forth in claim 9, wherein the voltage identification signal setting device is formed in the CPU.

14. A voltage regulating device comprising:

a voltage identification signal setting device for outputting a default voltage identification signal;

a voltage converter for receiving either the default voltage identification signal or a voltage identification regulating signal through a voltage identification signal bus and transmitting a controlled voltage;

a voltage monitoring and identification signal regulating device for receiving a controlling signal and transmitting the voltage identification regulating signal to the voltage converter through a voltage identification signal bus, and monitoring the controlled voltage; and a voltage identification signal bridge for passing the default voltage identification signal from the voltage identification signal setting device to the voltage converter through the voltage identification signal bus when the voltage monitoring and identification signal regulating device does not output the voltage identification regulating signal to the voltage converter through the voltage identification signal bus.

15. The voltage regulating device as set forth in claim 14, wherein the voltage monitoring and identification signal regulating device comprises:

a voltage identification signal regulator electrically connected to the voltage identification signal bus for receiving the controlling signal and then transmitting the voltage identification regulating signal to the voltage identification signal bus; and a voltage monitor electrically connected to the voltage identification signal bus for monitoring the controlled voltage according to the voltage identification signals on the voltage identification signal bus.

16. The voltage regulating device as set forth in claim 15, wherein the voltage identification signal regulator comprises:

a register for receiving and storing the controlling signal; and a 3-state buffer electrically coupled to the register and controlled by the controlling signal to either output the voltage identification regulating signal or turn the output of the 3-state buffer into a high impedance state.

17. The voltage regulating device as set forth in claim 15, wherein the voltage monitoring and identification signal regulating device further comprises a buffer electrically coupled between the voltage monitor and the voltage identification signal bus.

18. A voltage regulating device comprising:

a voltage identification signal setting device for outputting a default voltage identification signal;

a voltage converter electrically coupled to the voltage identification signal setting device for receiving a controlling signal and then transmitting a controlled voltage by selecting either the default voltage identification signal or a voltage identification regulating signal which is contained in the control signal; and a voltage monitor electrically coupled to the voltage identification signal setting device and the voltage converter for receiving the controlling signal and monitoring the controlled voltage.

19. A method for regulating voltage by the voltage regulating device as set forth in claim 17, comprising the steps of:

providing the default voltage identification signal by the voltage identification signal setting device;

outputting the controlled voltage having a default voltage value from the voltage converter according to the default voltage identification signal;

stopping monitoring the controlled voltage by the voltage monitor;

providing the controlling signal to the voltage converter and outputting the controlled voltage having a destination voltage value from the voltage converter according to the voltage identification regulating signal; and monitoring the controlled voltage according to the voltage identification regulating signal by the voltage monitor with a control of the controlling signal.

20. A method for regulating voltage, suitable to regulate the operating voltage of a CPU in a computer system, comprising the steps of:

providing a default voltage identification signal;

outputting the operating voltage of the CPU having a default voltage value according to the default voltage identification signal;

outputting a voltage identification regulating signal and blocking the default voltage identification signal by providing a controlling signal;

outputting the operating voltage of the CPU having a destination voltage value according to the voltage identification regulating signal; and monitoring the operating voltage of the CPU according to the voltage identification regulating signal.

* * * * *